US012731740B2

(12) United States Patent
McDaniel et al.

(10) Patent No.: US 12,731,740 B2
(45) Date of Patent: Sep. 8, 2026

(54) SYSTEM FOR ACCESSING SWITCH FOR LADDER

(71) Applicant: Caterpillar Global Mining Equipment LLC, Denison, TX (US)

(72) Inventors: Quintin McDaniel, Marana, AZ (US); Srinivas Chikkala, Tucson, AZ (US); Bradley Charles Sconzert, Tucson, AZ (US); Shamshad S. Ahmed, Oro-Valley, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 406 days.

(21) Appl. No.: 18/414,505

(22) Filed: Jan. 17, 2024

(65) Prior Publication Data

US 2025/0232927 A1 Jul. 17, 2025

(51) Int. Cl.
*H01H 9/02* (2006.01)
*B60R 3/02* (2006.01)

(52) U.S. Cl.
CPC ................. *H01H 9/02* (2013.01); *B60R 3/02* (2013.01)

(58) Field of Classification Search
CPC ............. B60R 3/02; H01H 9/02; H01H 9/287
See application file for complete search history.

(56) References Cited

U.S. PATENT DOCUMENTS 4,363,944 A * 12/1982 Poirier ................... H01H 9/287 220/242
6,472,619 B1 * 10/2002 Halphide ............... H01H 9/286 200/43.16
9,000,314 B2 4/2015 Westlund et al.
9,150,134 B2 10/2015 Westlund et al.
11,391,308 B2 7/2022 Tanaka et al.
2004/0043649 A1 * 3/2004 O'Connell ......... H01R 13/6397 439/135
2004/0246132 A1 * 12/2004 Kuan ................... B23D 59/001 340/565
2014/0022707 A1 * 1/2014 Westlund ............... B60K 35/10 361/632
2014/0138218 A1 * 5/2014 Westlund ................. H01H 3/20 200/43.16
2023/0258038 A1 * 8/2023 Yu ........................... E05F 15/73 49/31

* cited by examiner

*Primary Examiner* — Timothy J Thompson
*Assistant Examiner* — Rhadames Alonzo Miller

(57) ABSTRACT

A system for accessing a switch for a ladder of a work machine includes a cover movable between a closed position and an open position. In the closed position of the cover, the cover encloses the switch. The cover includes a lip portion. The system also includes a retention assembly. The retention assembly includes a spring member. The retention assembly also includes a lever coupled to the spring member. The lever includes a retention portion. The lever is movable between a first position and a second position. In the first position of the lever, the lever engages with the lip portion of the cover. In the second position of the lever, the lever disengages from the lip portion of the cover.

20 Claims, 6 Drawing Sheets

SYSTEM FOR ACCESSING SWITCH FOR LADDER

TECHNICAL FIELD

The present disclosure relates to a work machine, a system for accessing a switch for a ladder of the work machine, and a switch assembly for the ladder of the work machine.

BACKGROUND

A work machine, such as a mining truck, is often used for transportation of payload from one location to another. The work machine generally includes a ladder that allows an operator to board or deboard the work machine. Further, the ladder includes a pair of handrails disposed on either side of the ladder. Typically, the ladder is a powered access ladder that moves from a stowed position to a deployed position based on actuation via a switch. The switch may be a mechanical switch positioned proximate to the ladder. The operator may press the switch to move the ladder from the stowed position to the deployed position in an event of a power outage.

However, during boarding or deboarding the work machine, the operator may inadvertently press the switch that may cause the ladder to move to the deployed position. The lowering of the ladder may create a scissoring effect between a handrail that is fixedly coupled to an operator platform of the work machine and the handrails of the moving ladder, which is not desirable.

U.S. Pat. No. 9,150,134 discloses a service control center is provided on a machine at a position accessible to a service technician or an operator. The service control center includes a service control panel. Further, the service control panel includes a first rotary switch adapted to selectively operate a transmission locking system and a second rotary switch adapted to selectively operate an engine starter system. A first flange having a first opening configured to retain the first rotary switch in a locked position and a second flange having a second opening configured to retain the second rotary switch in a locked position.

SUMMARY OF THE DISCLOSURE

In an aspect of the present disclosure, a system for accessing a switch for a ladder of a work machine is provided. The system includes a cover movable between a closed position and an open position. In the closed position of the cover, the cover encloses the switch. The cover includes a lip portion. The system also includes a retention assembly. The retention assembly includes a spring member. The retention assembly also includes a lever coupled to the spring member. The lever includes a retention portion. The lever is movable between a first position and a second position. In the first position of the lever, the lever engages with the lip portion of the cover. In the second position of the lever, the lever disengages from the lip portion of the cover.

In another aspect of the present disclosure, a switch assembly for a ladder of a work machine is provided. The switch assembly includes a switch. The switch assembly also includes a system for accessing the switch. The system includes a cover movable between a closed position and an open position. In the closed position of the cover, the cover encloses the switch. The cover includes a lip portion. The system also includes a retention assembly. The retention assembly includes a spring member. The retention assembly also includes a lever coupled to the spring member. The lever includes a retention portion. The lever is movable between a first position and a second position. In the first position of the lever, the lever engages with the lip portion of the cover. In the second position of the lever, the lever disengages from the lip portion of the cover.

In yet another aspect of the present disclosure, a work machine is provided. The work machine includes a frame. The work machine also includes a ladder movable between a stowed position and a deployed position. The work machine further includes a switch to move the ladder from the stowed position to the deployed position. The work machine includes a system for accessing the switch. The system includes a cover movable between a closed position and an open position. In the closed position of the cover, the cover encloses the switch. The cover includes a lip portion. The system also includes a retention assembly. The retention assembly includes a spring member. The retention assembly also includes a lever coupled to the spring member at the first end of the spring member. The lever includes a retention portion. The lever is movable between a first position and a second position. In the first position of the lever, the lever engages with the lip portion of the cover. In the second position of the lever, the lever disengages from the lip portion of the cover.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
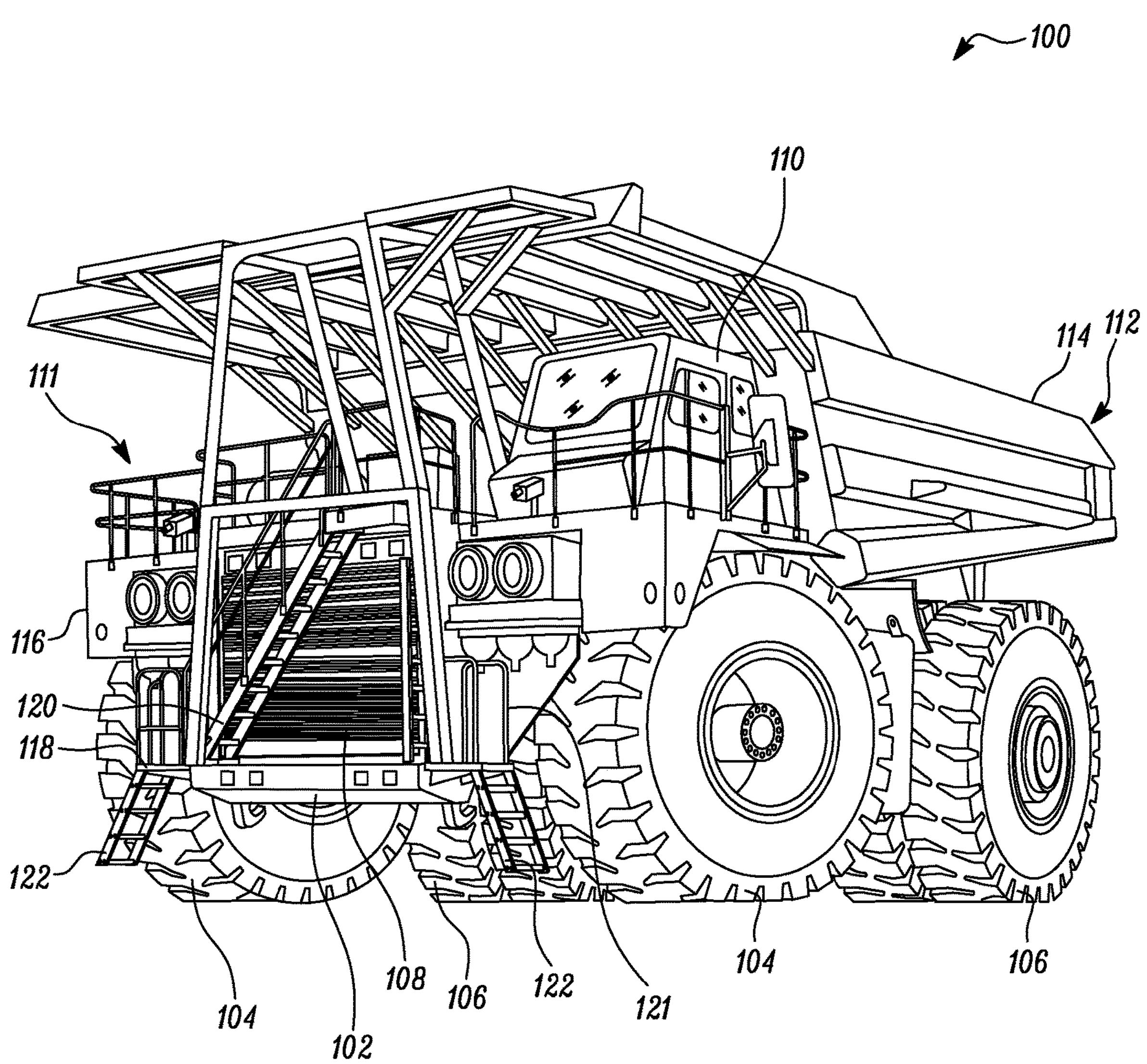
FIG. 1 is a schematic perspective view of an exemplary work machine.

Referring to FIG. 1, a schematic perspective view of a work machine 100 is illustrated. The work machine 100 is embodied as a mining truck that may be used to move a payload, such as, asphalt, debris, dirt, snow, feed, gravel, logs, raw minerals, recycled material, rock, sand, woodchips, etc. from one location to another location. Alternatively, the work machine 100 may be an excavator, a dozer, a wheel loader, a track-type tractor, a motor grader, etc. that may be used for various purposes, such as digging, construction, landscaping, and the like in various industries.

The work machine 100 includes a frame 102. The frame 102 supports a pair of front wheels 104 and a pair of rear wheels 106 of the work machine 100. The work machine 100 also includes an enclosure 108. The enclosure 108 may house a power source, such as, an engine (for e.g., an internal combustion engine), batteries, motors, and the like to provide power to various components of the work machine 100 for operational and mobility requirements.

The work machine 100 further includes a dump body 112. The dump body 112 includes a box portion 114. The box portion 114 of the dump body 112 may hold the payload. The work machine 100 includes an upper deck 116 and a lower deck 118. Each of the upper deck 116 and the lower deck 118 are supported by the frame 102.

The work machine 100 also includes an operator cabin 110 mounted to the frame 102. Particularly, the operator cabin 110 is disposed on the upper deck 116 of the work machine 100. The operator cabin 110 may include one or more controls (not shown) that may enable an operator to control the work machine 100. The operator may be seated within the operator cabin 110 to perform work operations.

The work machine 100 also includes an operator platform 111. Particularly, the operator platform 111 is defined on the upper deck 116 of the work machine 100. The operator may stand at the operator platform 111 to view ongoing work operations. The work machine 100 further includes a ladder 120. The ladder 120 connects the upper deck 116 and the lower deck 118. The ladder 120 allows the operator to climb up or down between the upper deck 116 and the lower deck 118.

The work machine 100 includes a handrail 121 fixedly coupled to the lower deck 118. The handrail 121 may assist the operator to deboard or board the work machine 100. The work machine 100 also includes a ladder 122. In some examples, the ladder 122 may allow the operator to climb up/down from the work machine 100. Specifically, the ladder 122 allows the operator to ascend/descend between the lower deck 118 and the ground surface. In the illustrated example of FIG. 1, the work machine 100 includes two ladders 122 disposed on either side of the lower deck 118. In other examples, the work machine 100 may include a single ladder 122. The ladder 122 is movable between a stowed position and a deployed position. Particularly, in the illustrated example of FIG. 1, the ladder 122 is illustrated in the deployed position. The work machine 100 also includes a switch 124 (see FIG. 3) to move the ladder 122 from the stowed position to the deployed position.

Figure 2:
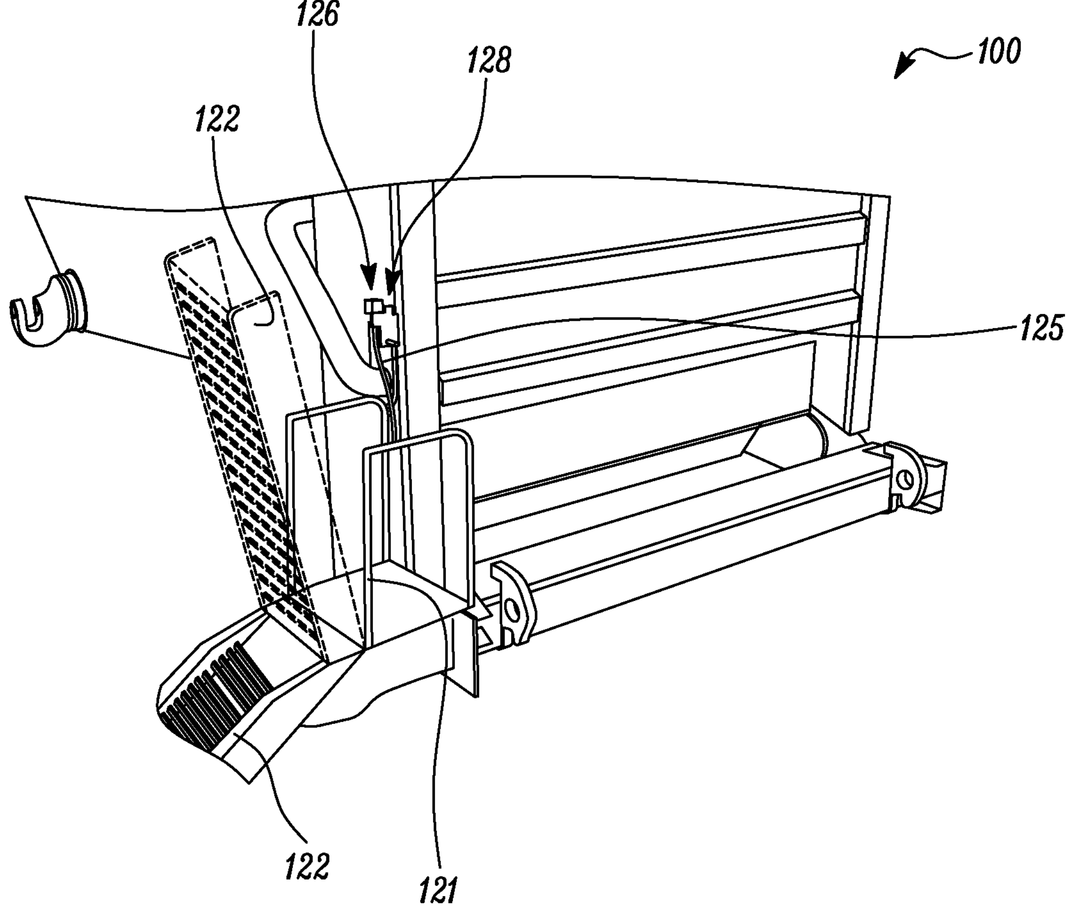
FIG. 2 is a schematic perspective view of a switch assembly disposed proximate to a ladder of the work machine of FIG. 1, according to an example of the present disclosure.

Referring to FIG. 2, a switch assembly 126 for the ladder 122 of the work machine 100 of FIG. 1 is illustrated. The switch assembly 126 is coupled to the lower deck 118 proximate to the handrail 121 of the work machine 100. The switch assembly 126 includes the switch 124 (see FIG. 3) to move the ladder 122 from the stowed position to the deployed position. In some examples, the switch 124 may include a mechanical switch such as a push-button, a pressure switch, and the like. In the illustrated example of FIG. 2, the switch 124 includes the push-button. In the illustrated example of FIG. 2, the ladder 122 is shown in the deployed position with solid lines and the ladder 122 is shown in the stowed position with dotted lines.

Further, the switch assembly 126 includes a system 128 for accessing the switch 124. The switch 124 may be communicably coupled to a control system (not shown) of the work machine 100 via a cable 125. In order to descend the work machine 100, the operator may press the switch 124 that may transmit a control signal to the control system to move the ladder 122 from the stowed position to the deployed position. In some examples, the control system may be an electrical control unit associated with the work machine 100.

Figure 3:
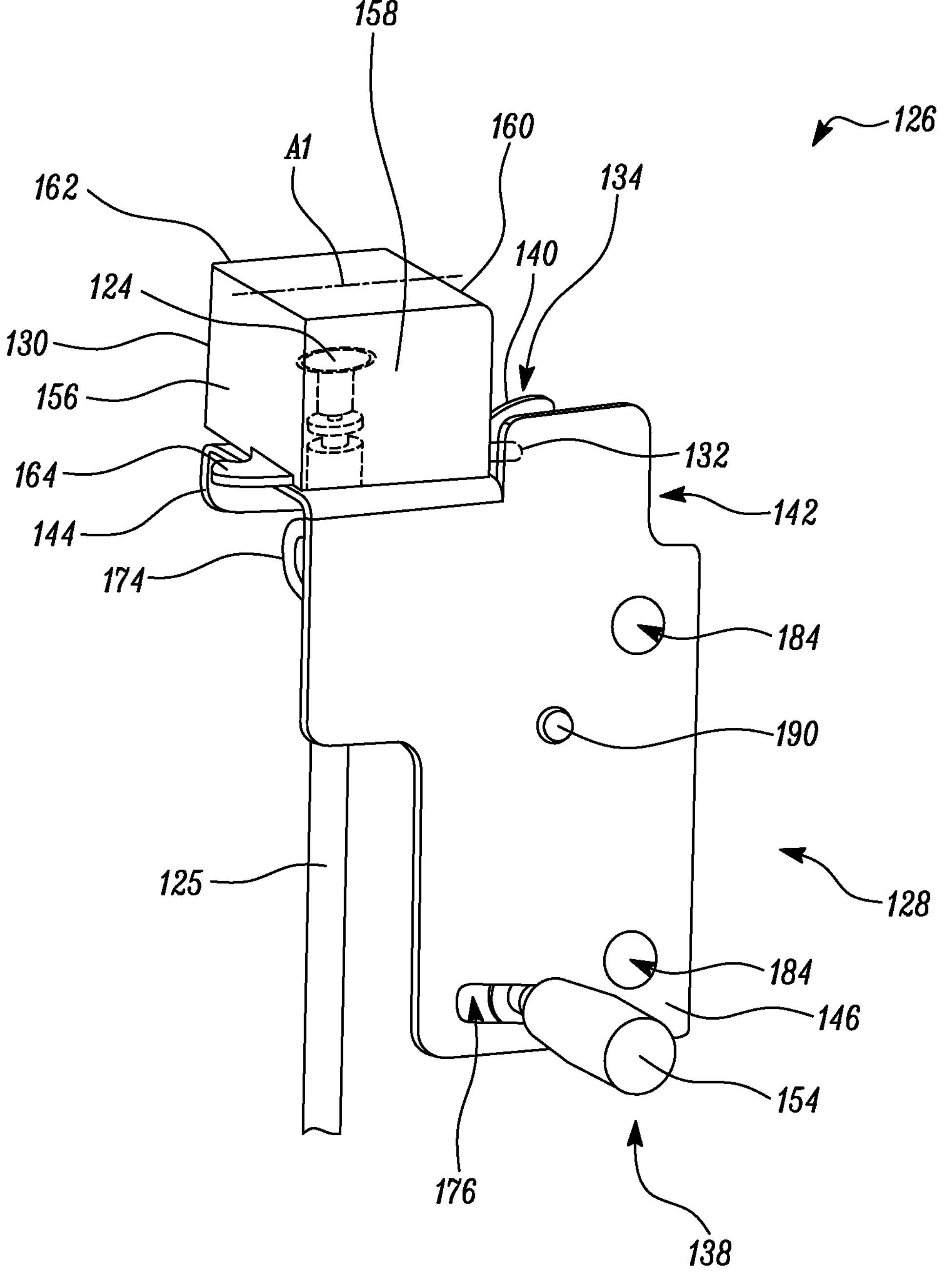
FIGS. 3 and 4 are schematic front perspective views of the switch assembly of FIG. 2.

Referring to FIG. 3, a schematic front perspective view of the switch assembly 126 of FIG. 2 is illustrated. The system 128 includes a cover 130 movable between a closed position (as illustrated in FIG. 3) and an open position (as illustrated in FIG. 6C). In the closed position of the cover 130, the cover 130 encloses the switch 124.

The cover 130 defines a first side 156, a second side 158, a third side 160 opposite to the first side 156, and a fourth side 162 (see FIG. 5) opposite to the second side 158. The cover 130 has a cube shaped design. In other examples, the cover 130 may have any other shape, such as a spherical shape, without limiting the scope of the present disclosure. The cover 130 includes a lip portion 132. Particularly, the lip portion 132 extends from the third side 160 of the cover 130 along a longitudinal axis A1. The cover 130 also includes a projection 164. The projection 164 extends from the first side 156 of the cover 130 along the longitudinal axis A1.

The system 128 also includes a bracket 142. The bracket 142 defines a first portion 144 and a second portion 146 extending from the first portion 144. In some examples, the first portion 144 may be coupled to the second portion 146 via welding. In other examples, the first portion 144 may be coupled to the second portion 146 via any other manufacturing process, or the first and second portions 144, 146 may be manufactured as a one-piece component. The first portion 144 defines an opening (not shown) that receives a portion of the switch 124.

The first portion 144 of the bracket 142 has an L-shaped design. In the closed position of the cover 130, the cover 130 at least partially contacts the first portion 144 of the bracket 142. Further, the second portion 146 of the bracket 142 is coupled to a spring member 136 (see FIG. 4). Specifically, the second portion 146 includes a staple 174 that is coupled to the spring member 136. The second portion 146 of the bracket 142 defines a slot 176 and a pair of openings 184. The slot 176 has an arcuate profile.

Figure 4:
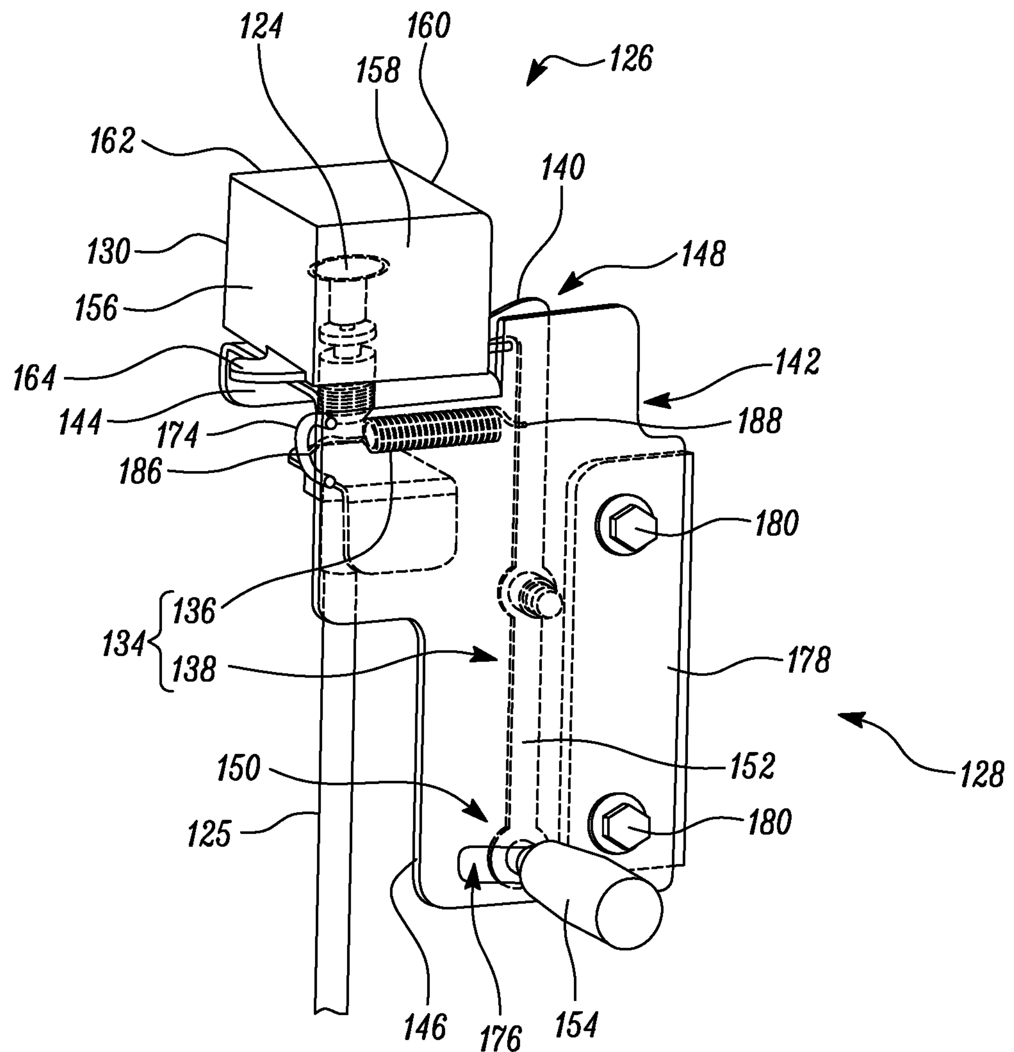

Referring now to FIG. 4, the system 128 further includes a retention assembly 134. The retention assembly 134 includes the spring member 136. The retention assembly 134 also includes a lever 138 coupled to the spring member 136. Specifically, one end 186 of the spring member 136 is coupled to the staple 174 of the bracket 142 and another end 188 of the spring member 136 is coupled to the lever 138. The lever 138 includes a retention portion 140. The retention portion 140 includes a hook shaped portion herein.

Further, the lever 138 defines a first end 148 and a second end 150. Particularly, the retention portion 140 is disposed at the first end 148 of the lever 138. The lever 138 is movable between a first position (as illustrated in FIGS. 3 and 4) and a second position (as illustrated in FIGS. 6B and 6C). In the first position of the lever 138, the lever 138 engages with the lip portion 132 (see FIGS. 3 and 6C) of the cover 130. Specifically, in the first position of the lever 138, the retention portion 140 engages with the lip portion 132 of the cover 130. The spring member 136 biases the lever 138 to the first position. In the second position of the lever 138, the lever 138 disengages from the lip portion 132 of the cover 130. Specifically, in the second position of the lever 138, the retention portion 140 disengages from the lip portion 132 of the cover 130.

Further, the lever 138 includes an arm member 152 including the retention portion 140. The arm member 152 is pivotally coupled to the second portion 146 of the bracket 142. Specifically, the arm member 152 is pivotally coupled to the arm member 152 via a pivoting element 190. The lever 138 also includes a handle 154 at the second end 150 of the lever 138. The handle 154 extends orthogonally from the arm member 152. The handle 154 may be coupled to the arm member 152 via a fastener 153 (see FIG. 5). In some examples, the fastener 153 may include a bolt, a screw, a rivet or any other fastening means for coupling the handle 154 with the arm member 152. Further, the handle 154 extends through the slot 176 of the bracket 142 and is movable within the slot 176.

Figure 5:
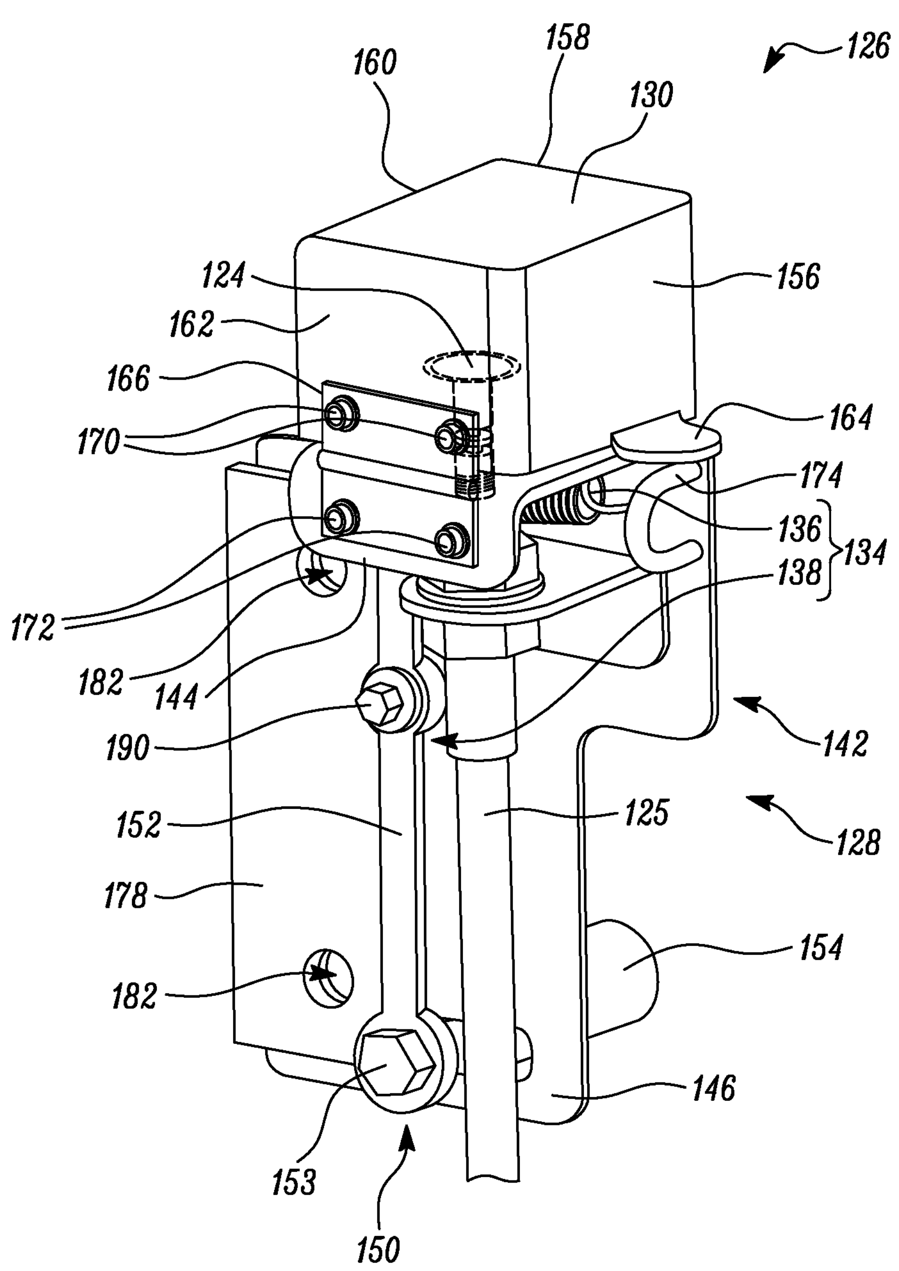
FIG. 5 is a schematic rear perspective view of the switch assembly of FIG. 2.

Referring now to FIG. 5, the system 128 includes a coupling device 166 that movably couples the cover 130 with the first portion 144 of the bracket 142. The coupling device 166 includes a spring-loaded hinge that biases the cover 130 to the closed position. The coupling device 166 is coupled to the fourth side 162 of the cover 130 via one or more fasteners 170. In the illustrated example of FIG. 5, the coupling device 166 is coupled to the fourth side 162 of the cover 130 via two fasteners 170. In other examples, the coupling device 166 may be coupled to the fourth side 162 of the cover 130 via any number of fasteners 170, based on application attributes. In some examples, the fasteners 170 may include a bolt, a screw, a rivet or any other fastening means for coupling the coupling device 166 to the fourth side 162 of the cover 130.

Further, the coupling device 166 is coupled to the first portion 144 of the bracket 142 via one or more fasteners 172. In the illustrated example of FIG. 5, the coupling device 166 is coupled to the first portion 144 of the bracket 142 via two fasteners 172. In other examples, the coupling device 166 may be coupled to the first portion 144 of the bracket 142 via any number of fasteners 172 based on application attributes. In some examples, the fasteners 172 may include a bolt, a screw, a rivet or any other fastening means for coupling the coupling device 166 to the first portion 144 of the bracket 142.

The switch assembly 126 further includes a clamping plate 178. The clamping plate 178 couples the system 128 to the lower deck 118 (see FIG. 1) of the work machine 100 (see FIG. 1). The clamping plate 178 defines a pair of openings 182 that align with the openings 184 (see FIG. 3) in the second portion 146 of the bracket 142 to receive a pair of fastening means 180 (see FIG. 4). In some examples, the fastening means 180 may include a bolt, a screw, a rivet, or any other fastening means for coupling the switch assembly 126 to the work machine 100 via the clamping plate 178.

In some examples, the components of the system 128 may be made of a polymeric material, a metallic material, a composite material, an alloy, and the like, without limiting the scope of the present disclosure.

Figure 6A:
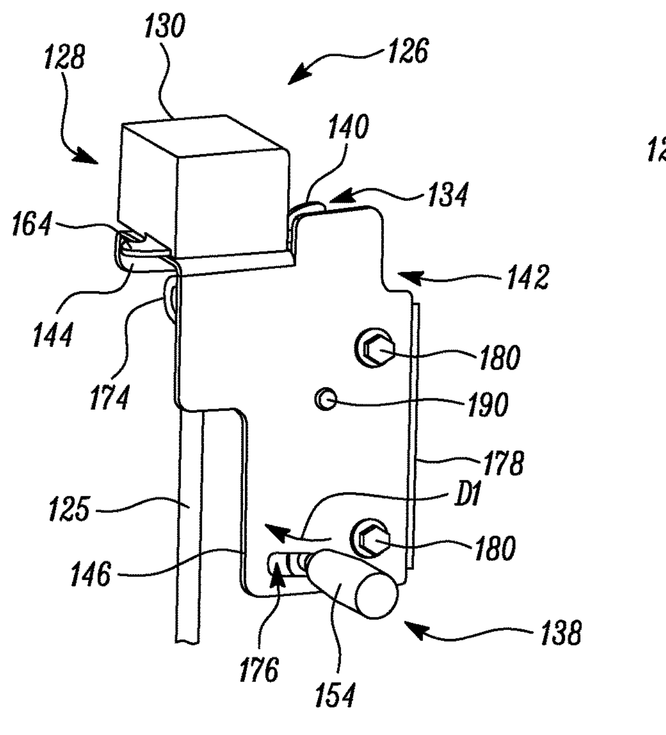
FIGS. 6A to 6C illustrate an operation of the switch assembly of FIG. 2.
Figure 6B:
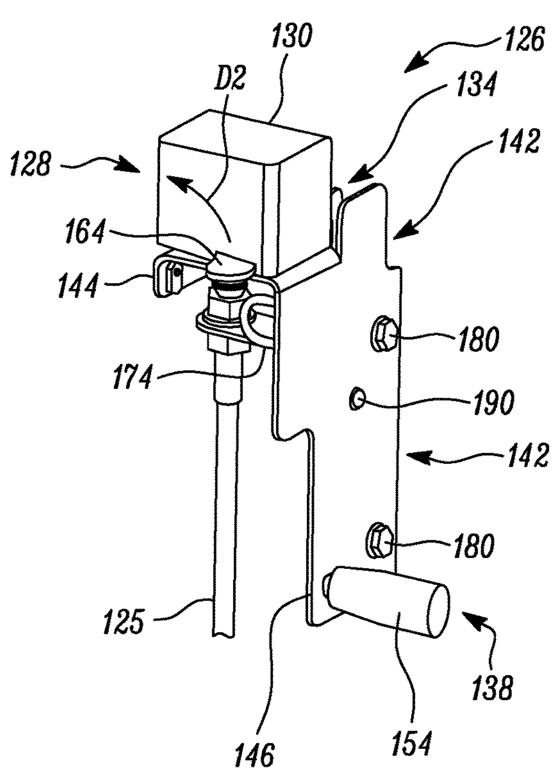
Figure 6C:
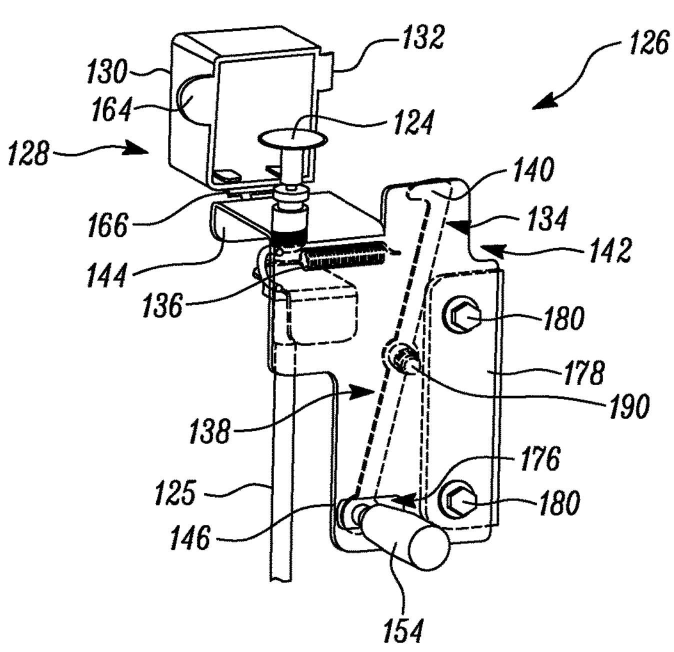

FIGS. 6A to 6C illustrate an operation of the switch assembly 126 of FIG. 2 to move the ladder 122 (see FIG. 2) of the work machine 100 (see FIG. 1) from the stowed position to the deployed position.

As is apparent from FIGS. 6A, the cover 130 is in the closed position and the lever 138 is in the first position. The retention portion 140 of the lever 138 engages with the lip portion 132 (see FIG. 6C) of the cover 130. Further, in order to move the ladder 122 (see FIG. 2) from the stowed position to the deployed position, the operator may use one hand to move the lever 138 in a direction D1. The movement of the lever 138 in the direction D1 causes the lever 138 to move from the first position to the second position (as illustrated in FIGS. 6B and 6C). Specifically, the operator may use the handle 154 to move the lever 138 to the second position. The movement of the lever 138 disengages the retention portion 140 of the lever 138 from the lip portion 132 (see FIG. 6C) of the cover 130. The disengagement of the retention portion 140 from the lip portion 132 may unlock the cover 130.

Referring now to FIG. 6B, the operator may use their second hand to lift the cover 130. The operator may hold the projection 164 and move the projection 164 in a direction D2 to move the cover 130 to the open position.

Referring now to FIG. 6C, once the cover 130 is moved to the open position, the operator may be able to access the switch 124 and actuate the switch 124 to move the ladder 122 (see FIG. 2) to the deployed position.

Further, once the operator releases the projection 164 of the cover 130, the cover 130 may move back to the closed position. Furthermore, as the operator releases the lever 138, the lever 138 may move back to the first position due to a biasing action of the spring member 136 and the retention portion 140 engages with the lip portion 132 of the cover 130, thereby locking the lever 138 with the cover 130.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure is related to the system 128 for accessing the switch 124 for the ladder 122 of the work machine 100. The system 128 includes the cover 130 that encloses the switch 124. Further, the cover 130 is movable between the closed position and the open position. The closed position is a default position of the cover 130, that may prevent an inadvertent pressing of the switch 124 by operators. Further, in the open position, the cover 130 may allow the operator to press the switch 124 to move the ladder 122 from the stowed position to the deployed position.

Furthermore, the system 128 includes the retention assembly 134. The retention assembly 134 includes the lever 138. The lever 138 includes the retention portion 140 that engages with the lip portion 132 of the cover 130 and may retain the cover 130 in the closed position at all times. The operator may use the handle 154 of the lever 138 with one hand to move the lever 138 to the second position and lift the cover 130 using another hand to access the switch 124 for the ladder 122. Therefore, the system 128 of the present disclosure involves usage of both hands of operators to access the switch 124, thereby lowering the possibility of inadvertent pressing of the switch 124 and reducing the susceptibility of a scissoring effect due to unintentional lowering of the ladder 122.

Moreover, the system 128 is simple in construction and may be cost-effective to implement as the system 128 does not require costly/complicated set-ups. Further, the system 128 may be retrofitted to existing work machines to enclose the switch 124.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A system for accessing a switch for a ladder of a work machine, the system comprising:

a cover movable between a closed position and an open position, wherein, in the closed position of the cover, the cover encloses the switch, the cover including a lip portion; and a retention assembly including:

a spring member; and a lever coupled to the spring member, the lever including a retention portion, wherein the lever is movable between a first position and a second position, wherein, in the first position of the lever, the lever engages with the lip portion of the cover, and wherein, in the second position of the lever, the lever disengages from the lip portion of the cover.

2. The system of claim 1, further comprising a bracket defining a first portion and a second portion extending from the first portion, wherein, in the closed position of the cover, the cover at least partially contacts the first portion of the bracket, and wherein the second portion of the bracket is coupled to the spring member.

3. The system of claim 2, further comprising a coupling device that movably couples the cover with the first portion of the bracket.

4. The system of claim 3, wherein the coupling device includes a spring-loaded hinge that is adapted to bias the cover to the closed position.

5. The system of claim 2, wherein the lever defines a first end and a second end, and wherein the retention portion is disposed at the first end of the lever.

6. The system of claim 5, wherein the lever further includes:

an arm member including the retention portion, wherein the arm member is pivotally coupled to the second portion of the bracket; and a handle at the second end of the lever, wherein the handle extends orthogonally from the arm member.

7. The system of claim 1, wherein the spring member is adapted to bias the lever to the first position.

8. A switch assembly for a ladder of a work machine, the switch assembly comprising:

a switch; and a system for accessing the switch, the system including:

a cover movable between a closed position and an open position, wherein, in the closed position of the cover, the cover encloses the switch, the cover including a lip portion; and a retention assembly including:

a spring member; and a lever coupled to the spring member, the lever including a retention portion, wherein the lever is movable between a first position and a second position, wherein, in the first position of the lever, the lever engages with the lip portion of the cover, and wherein, in the second position of the lever, the lever disengages from the lip portion of the cover.

9. The switch assembly of claim 8, wherein the system further includes a bracket defining a first portion and a second portion extending from the first portion, wherein, in the closed position of the cover, the cover at least partially contacts the first portion of the bracket, and wherein the second portion of the bracket is coupled to the spring member.

10. The switch assembly of claim 9, wherein the system further includes a coupling device that movably couples the cover with the first portion of the bracket.

11. The switch assembly of claim 10, wherein the coupling device includes a spring-loaded hinge that is adapted to bias the cover to the closed position.

12. The switch assembly of claim 9, wherein the lever defines a first end and a second end, and wherein the retention portion is disposed at the first end of the lever.

13. The switch assembly of claim 12, wherein the lever further includes:

an arm member including the retention portion, wherein the arm member is pivotally coupled to the second portion of the bracket; and a handle at the second end of the lever, wherein the handle extends orthogonally from the arm member.

14. The switch assembly of claim 8, wherein the spring member is adapted to bias the lever to the first position.

15. A work machine comprising:

a frame;

a ladder movable between a stowed position and a deployed position;

a switch to move the ladder from the stowed position to the deployed position; and a system for accessing the switch, the system including:

a cover movable between a closed position and an open position, wherein, in the closed position of the cover, the cover encloses the switch, the cover including a lip portion; and a retention assembly including:

a spring member; and a lever coupled to the spring member, the lever including a retention portion, wherein the lever is movable between a first position and a second position, wherein, in the first position of the lever, the lever engages with the lip portion of the cover, and wherein, in the second position of the lever, the lever disengages from the lip portion of the cover.

16. The work machine of claim 15, wherein the system further includes a bracket defining a first portion and a second portion extending from the first portion, wherein, in the closed position of the cover, the cover at least partially contacts the first portion of the bracket, and wherein the second portion of the bracket is coupled to the spring member.

17. The work machine of claim 16, wherein the system further includes a coupling device that movably couples the cover with the first portion of the bracket, and wherein the coupling device includes a spring-loaded hinge that is adapted to bias the cover to the closed position.

18. The work machine of claim 17, wherein the spring member is adapted to bias the lever to the first position.

19. The work machine of claim 16, wherein the lever defines a first end and a second end, and wherein the retention portion is disposed at the first end of the lever.

20. The work machine of claim 19, wherein the lever further includes:

an arm member including the retention portion, wherein the arm member is pivotally coupled to the second portion of the bracket; and a handle at the second end of the lever, wherein the handle extends orthogonally from the arm member.

* * * * *